United States Patent [19]

Nakata et al.

[11] Patent Number: 4,748,610
[45] Date of Patent: May 31, 1988

[54] SERVO SYSTEM IN DATA READING APPARATUS

[75] Inventors: Junichi Nakata; Katsumi Kawamura, both of Saitama, Japan

[73] Assignee: Pioneer Electronic Corporation, Tokyo, Japan

[21] Appl. No.: 589,802

[22] Filed: Mar. 15, 1984

[30] Foreign Application Priority Data

Mar. 16, 1983 [JP] Japan .............................. 58-38538[U]

[51] Int. Cl.$^4$ ............................................. G11B 7/095
[52] U.S. Cl. ......................................... 369/44; 369/46
[58] Field of Search .................... 250/201 DF, 202; 369/43, 44, 45, 46, 54, 58

[56] References Cited

U.S. PATENT DOCUMENTS

| 4,406,000 | 9/1983 | Shoji et al. | 369/44 |
| 4,512,002 | 4/1985 | Kosaka et al. | 369/44 |
| 4,561,080 | 12/1985 | Yamazaki | 250/201 DF |
| 4,587,644 | 5/1986 | Fujiie | 369/54 X |

FOREIGN PATENT DOCUMENTS 926 1/1980 Japan .

Primary Examiner—Aristotelis M. Psitos
Attorney, Agent, or Firm—Sughrue, Mion, Zinn, Macpeak & Seas

[57] ABSTRACT

A servo system for controlling the position of a reading beam in an optical video disc player or the like in which an offset signal for cancelling an offset in an error signal used for controlling the position of the reading beam is eliminated when the level of the reading signal falls below a predetermined level. Accordingly, erroneous operations such as defocusing and track jumping are prevented when the reading beam crosses scratches, dust, smudges or the like on the recording medium.

5 Claims, 3 Drawing Sheets

SERVO SYSTEM IN DATA READING APPARATUS

BACKGROUND OF THE INVENTION

The present invention relates to a servo system for controlling the reading position in a data reading apparatus.

In a data reading apparatus such as an optical video disc player, a so-called focus servo system is employed to accurately focus the laser beam on a recording medium, namely, a recording disc. In addition, a so-called "tracking servo system" is used to cause the laser beam focused on the recording surface of the recording disc to accurately follow the track on the recording surface.

An example of a conventional servo system for controlling a reading position employing the above-described focus servo system and tracking servo system is shown in FIGS. 1A and 1B. In FIG. 1, three spot beams 2, 3 and 4, which are obtained by focusing a laser beam, are applied to a recording track 1, the remaining spot beams 3 and 4 are on opposite edges of the track 1. Accordingly, when the detecting spot beam 2 is displaced in a direction perpendicular to the track (radially of the video disc), the difference in light quantity between the reflected beams of the spot beams 3 and 4 changes according to the direction of displacement and the amount of displacement of the detecting spot beam 2. The reflected beams of the spot beams 3 and 4 are converted to electrical signals by photoelectric conversion elements 5 and 6. These electrical signals are outputted as tracking error forming signals A and B, respectively.

The reflected beam of the detecting spot beam 2 is applied through a cylindrical lens (not shown) to the light-detecting surface of a photoelectric conversion element 7. The plane including the generating line of the cylindrical lens is different from the plane perpendicular thereto in the position on the optial axis where the light beam passed through the cylindrical lens is focused. Therefore, the shape of the light beam projected onto the light-detecting surface of the photoelectric conversion element 7 changes according to the positional relationship between the recording surface of the recording disc and the focusing point of the laser beam. In order to detect the change in shape of the light beam projected onto the light-detecting surface of the photoelectric conversion element 7, the element 7 is provided with four light-detecting units which are independent of one another and which are arranged as if divided into four parts by two straight lines. The light-detecting surface of the photoelectric conversion element 7 is arranged at the position where, when the focusing point of the laser beam is positioned on the recording surface of the recording disc accurately, the reflected beam passed through the cylindrical lens becomes substantially circular. Thus the difference in level between the outputs of adders 8 and 9, each adding the outputs of the opposed units of the photoelectric conversion element 7, is indicative of the direction and amount of displacement of the focusing point of the laser beam. The outputs of the adders 8 and 9 are provided as focus error forming signals C and D, respectively. This conventional focus servo device is described in more detail in Japanese Laid-Open Patent Application No. 926/1980.

The outputs of the adders 8 and 9 are applied to an adder 10, the output of which is provided as a read data signal, which is an RF (radio frequency) signal.

A pair of signals, such as the tracking error forming signals A and B or the focus error forming signals C and D, which form an error signal, are applied through resistors $R_1$ and $R_2$ to the inverting input terminal and the noninverting input terminal, respectively, of an operational amplifier $OP_1$. The noninverting input terminal of the operational amplifier $OP_1$ is grounded through a resistor $R_3$. The inverting input terminal of the amplifier $OP_1$ is connected through a resistor $R_4$ to the output terminal. The operational amplifier $OP_1$ and the resistors $R_1$ through $R_4$ form a differential amplifier circuit 11. A signal corresponding to the difference in level between the pair of signals is amplified by the differential amplifier circuit 11, and is outputted as a tracking error signal or a focus error signal. An offset voltage is applied through a resistor $R_5$ to the inverting input terminal of the operational amplifier $OP_1$ to eliminate the offset which may be present in the tracking error signal or the focus error signal due to variations in characteristics between the photoelectric conversion elements 5 and 6, or between the light-detecting units of the photoelectric conversion element 7. The offset voltage is provided at the movable contact of a variable resistor $VR_1$, and fixed contacts of which are connected between the positive and negative terminals of the power source. The movable contact of the variable resistor $VR_1$ is grounded through a capacitor $C_1$.

The output error signal of the differential amplifier circuit 11 is applied through a resistor $R_6$ to the inverting input terminal of an operational amplifier $OP_2$, the noninverting input terminal of which is grounded through a resistor $R_7$. The output of the operational amplifier $OP_2$ is applied to one end of a coil L through a buffer amplifier 12 composed of transistors $Q_1$ and $Q_2$, a capacitor $C_2$ and resistors $R_8$ and $R_9$. The coil L is either a drive coil serving as a tracking actuator for driving a tracking mirror (not shown) or a focus motor rotor serving as a focus actuator for driving a focusing lens (not shown). The other end of the coil L is grounded through a resistor $R_{10}$. A voltage corresponding to a drive current flowing in the coil L is developed across the resistor $R_{10}$. The voltage thus developed is applied through a feedback resistor $R_{11}$ to the inverting input terminal of the operational amplifier $OP_2$.

In the conventional servo system thus constructed, the tracking mirror or the focusing lens is operated so that the error signal level becomes zero, as a result of which the position of the focusing point of the laser beam on the recording track or on the recording surface is controlled accurately.

The above-described conventional servo system is, however, disadvantageous in that when the difference in level between the pair of signals forming the error signal is eliminated, such as may be effected by scratches, dust or smudges on the recording medium, only the offset voltage is amplified, thus supplying an unwanted drive current to the actuator. As a result, erroneous operations such as defocusing and track jumping may occur.

Accordingly, an object of invention is to provide a servo system for a data reading apparatus which can control the reading position without being affected by scratches, dust or smudges on the recording medium.

SUMMARY OF THE INVENTION

In a servo system for a data reading apparatus in which the reading position in the apparatus is controlled by an error signal which indicates displacement of the reading position and to which an offset voltage has been applied to eliminate an offset which may occur in the error signal, according to the invention, the decrease in level of the reading signal is detected to provided a detection signal, and offset voltage correcting means is provided to eliminate the offset voltage according to the detection signal.

DESCRIPTION OF THE PREFERRED EMBODIMENTS

Preferred embodiments of the invention will now be described in detail with reference to FIGS. 2 and 3.

Figure 1A:
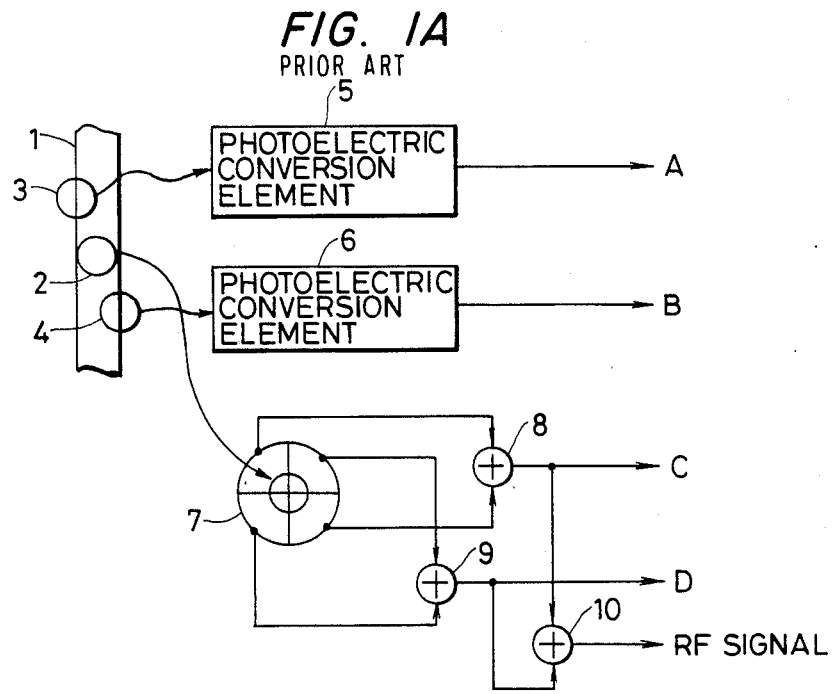
FIGS. 1A and 1B are an explanatory diagram and a circuit diagram, respectively, showing a conventional servo system in a data reading apparatus.
Figure 1B:
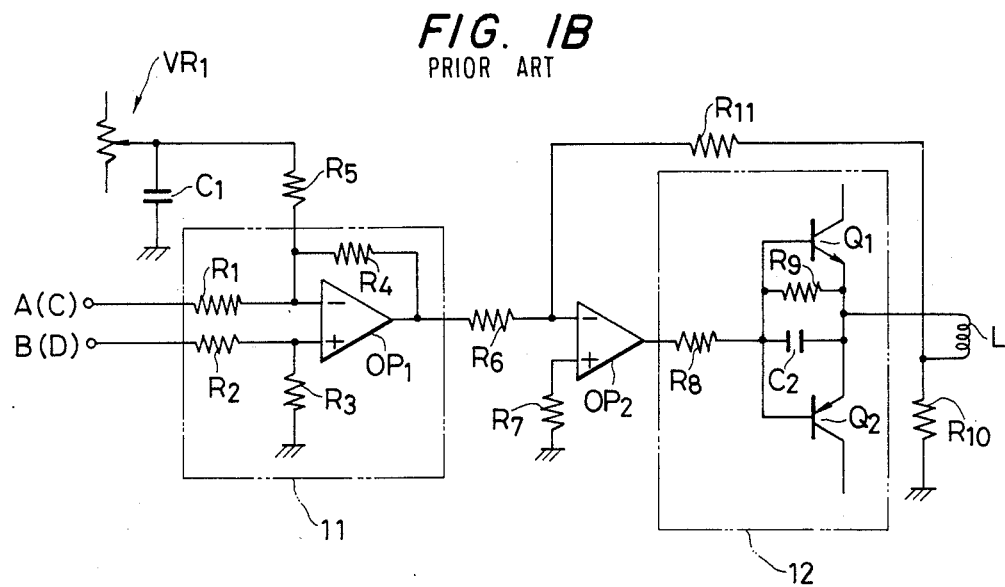
Figure 2:
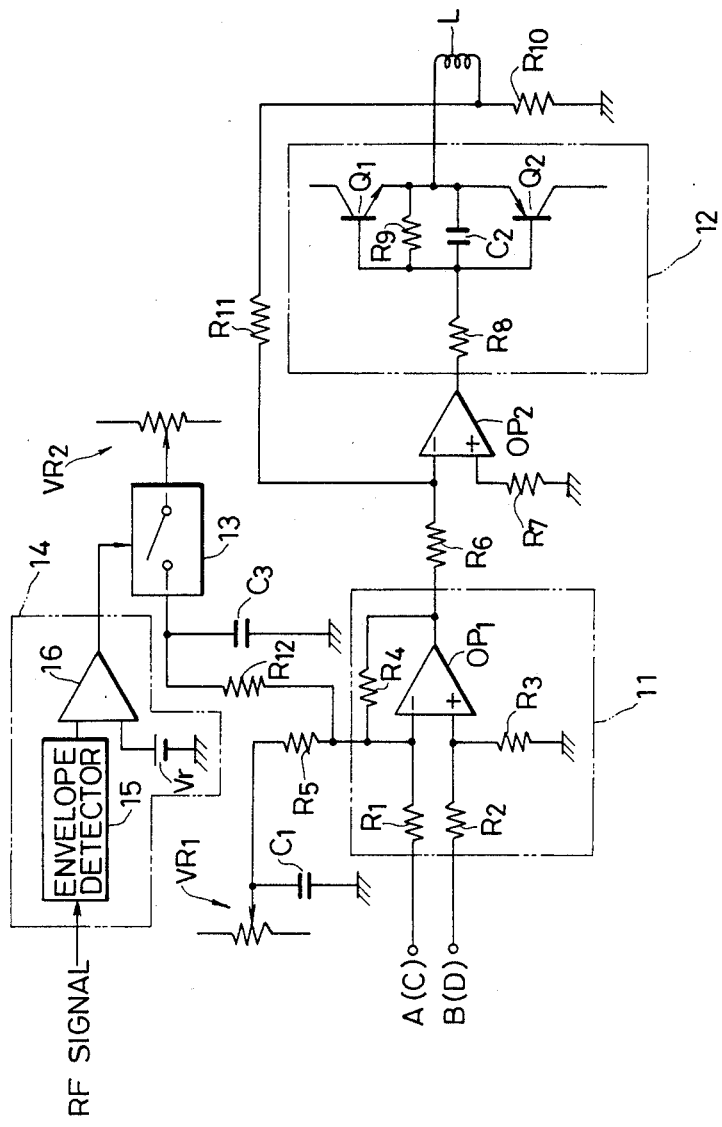
FIG. 2 is a circuit diagram, partly as a block diagram, showing a preferred embodiment of a servo system of the invention.

As is shown in FIG. 2, in the first embodiment, a differential amplifier circuit 11, a buffer amplifier 12, an operational amplifier $OP_2$, a coil L, resistor $R_5$, $R_6$, $R_9$ and $R_{10}$, a variable resistor $VR_1$ and a capacitor $C_1$ are connected in the same manner as in FIG. 1B. However, it should be noted that the servo system of FIG. 2 differs from that of FIG. 1B in the following points: A voltage provided at the movable contact of a variable resistor $VR_2$ is applied through an analog switch 13 and a resistor $R_{12}$ to the inverting input terminal of the operational amplifier $OP_1$. The variable resistor $VR_2$ is connected between the positive and negative terminals of the power soruce. The analog switch 13 is turned on, for instance, when a low level signal is applied to its control input terminal. The output terminal of the analog switch 13 is grounded through a capacitor $C_3$. The analog switch 13, the variable resistor $VR_2$, the resistor $R_{12}$ and the capacitor $C_3$ form an offset voltage correcting circuit.

The output of a signal level decrease detecting circuit 14 is applied to the control input terminal of the analog switch 13. The circuit 14 is composed of an envelope detector 15 including, for instance, an AM detector circuit for detecting the envelope of the RF signal, and a comparator 16 for comparing the output of the envelope detector 15 with a reference voltage $V_r$. That is, the signal level decrease detecting circuit 14 is so designed that, when the envelope signal level of the RF signal become lower than the reference level $V_r$, because of a level reduction of the RF signal, the comparator 6 outputs a detection signal, which is a low level signal.

In the circuit thus constructed, when the signal level of the RF signal is decreased by scratches, dust or smudges on the recording medium, the detection signal is applied to the control input terminal of the analog switch 13. As a result, the analog switch 13 is turned on, and the voltage at the movable contact of the variable resistor $VR_2$ is applied through the analog switch 13 and the resistor $R_{12}$ to the inverting input terminal of the operational amplifier $OP_1$. Accordingly, the offset voltage applied through the resistor $R_5$ to the inverting input terminal of the operational amplifier $OP_1$ can be cancelled by suitably selecting the position of the movable contact of the variable resistor $VR_2$. That is, when the difference in level between the pair of signals forming the error signal is eliminated by the presence of scratches, dust or smudges on the recording medium, the offset voltage is cancelled so that the error signal level can be maintained at substantially zero. Thus, unwanted current flow in the actuator is prevented.

Figure 3:
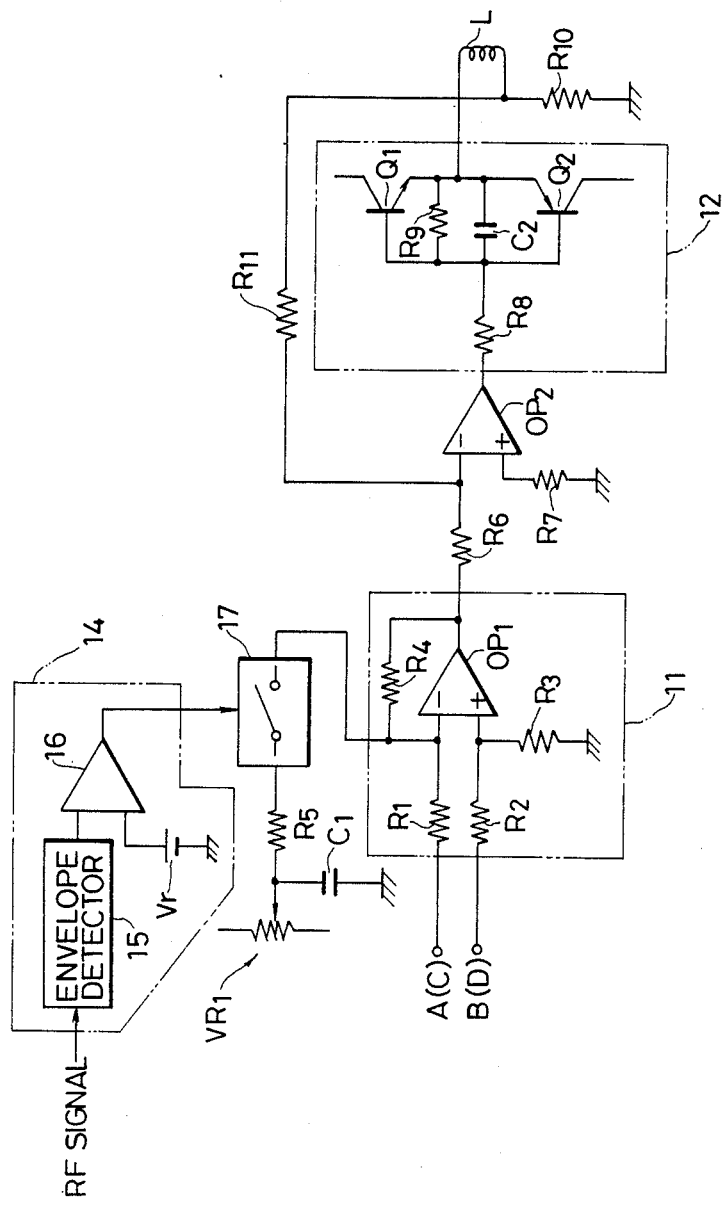
FIG. 3 is a circuit diagram, partly as a block diagram, showing another embodiment of the invention.

FIG. 3 is a block diagram showing a second embodiment of the invention. As is apparent from FIG. 3, a differential amplifier 11, a buffer amplifier 12, an operational amplifier $OP_2$, a coil L, and resistor $R_6$, $R_9$ and $R_0$ are connected in the same manner as in FIG. 1B. However, the embodiment in FIG. 3 differs in the following points: The offset voltage provided at the movable contact of the variable correcting device, namely, an analog switch 17, to the inverting input terminal of the operational amplifier $OP_1$. The analog switch 17 is turned off, for instance, when a low level signal is applied to its control input terminal. The control input terminal of the analog switch 17 receives the output of the signal level decrease detecting circuit 14, the latter including an envelope detector 15 and a comparator 16.

In the circuit thus constructed, when the level of the RF signal is decreased by the presence of scratches, dust or smudges on the recording medium the detection signal, which is a low level signal, is applied to the control input terminal of the analog switch 17, the analog switch 17 is turned off, suspending the application of the offset voltage to the inverting input terminal of the operational amplifier $OP_1$ which is developed at the movable contact of the variable resistor $VR_1$. This is equivalent to the elimination of the offset voltage. Accordingly, when the difference in level between the pair of signals forming the errors signal is eliminated by the presence of scratches, dust or smudges on the recording medium, the offset voltage applied to the inverting input terminal of the operational amplifier $OP_1$ is eliminated so that the error signal level is maintained substantially at zero. Thus, the problem caused by unwanted current in the actuator is prevented.

In the above-described embodiments, the signal level decrease detecting circuit 14 detects the decrease in level of the RF signal using the envelope detector 15, which detects the RF signal's envelope. However, the circuit 14 may be so designed that the level decrease of the RF signal is detected by an FM detector which, when the level of the RF signal becomes lower than a threshold value, detects a decrease of the instantaneous frequency and changes its output voltage accordingly. In the above-described embodiments, the offset voltage correcting device is so designed that, according to the detection signal, the correcting voltage is added to the offset voltage, or the application of the offset voltage is suspended. However, the offset voltage correcting function can be implemented by varying the gain of the differential amplifier circuit 11 according to the detection signal.

In the servo system for a data reading apparatus according to the invention, the offset voltage in the error signal is corrected when the level of the RF signal decreases. Accordingly, the erroneous generation of error signals due to the presence of scratches, dust or smudges on the recording medium is prevented. Furthermore, erroneous operations, such as defocusing and track jumping are prevented. Thus, the servo system of the invention can maintain the operation of the data reading apparatus stable.

While a servo system for the optical data reading apparatus has been described, it should be noted that the invention is not limited thereto or thereby. The technical concept of the invention may be applied, for instance, to a tracking servo system in an electrostatic capacity type data reading apparatus.

We claim:

1. A servo control detecting system of a data reading apparatus for controlling a reading position of said apparatus, comprising:

means for providing a reading signal for data recorded at said reading position;

detecting means for providing a detection signal indicative of a level of said reading signal;

a source of a reference signal;

means for comparing said detection signal with said reference level and indicating when said detection signal falls below said reference level;

means for providing an error signal indicative of a direction and a magnitude of displacement of said reading position from a normal reading position, said error signal having an offset component;

means for providing an offset to said error signal to cancel said offset component from said error signal; and means for eliminating said offset to said error signal in response to said comparing means indicating said detecting signal falling below said reference level.

2. The servo control detecting system as recited in claim 1, wherein said means for eliminating said offset in said error signal comprises means for providing a second offset having an amplitude equal to the amplitude of said offset and a polarity opposite to the polarity of said offset.

3. The servo control detecting system as recited in claim 2, wherein said means for eliminating said offset in said error signal further comprises signal adding means receiving as a first input said error signal, and swiatching means operating in response to an output of said comparator for switchably applying said second offset to a second input of said adding means.

4. The servo control detecting system as recited in claim 1, wherein said means for providing an offset to said error signal comprises a source of an offset signal, switching means having an input coupled to said source of said offset signal, signal adding means receiving as a first input said error signal and as a second input an output of said switching means, and wherein said means for eliminating said offset in said error signal comprises means operating said switching means in response to said comparing means to open said switching means when said comparing means indicates said detecting signal has fallen below said reference level.

5. The servo control detecting system as recited in claim 4, wherein said switching means operates in response to an output of said comparing means.

* * * * *